United States Patent
Wasinger et al.

[19]

[11] Patent Number: 5,914,994
[45] Date of Patent: Jun. 22, 1999

[54] STORAGE BASKET AND METHOD FOR COMPACT STORAGE OF FUEL ELEMENTS AND CONTROL RODS

[75] Inventors: Karl Wasinger, Mühlheim; Eberhard Wilhelms, Neu Isenburg; Rudi Maas, Neu-Anspach, all of Germany

[73] Assignee: Siemens Aktiengesellschaft, Munich, Germany

[21] Appl. No.: 08/990,351

[22] Filed: Dec. 15, 1997

Related U.S. Application Data

[63] Continuation of application No. PCT/DE96/01017, Jun. 11, 1996.

[30]   Foreign Application Priority Data

Jun. 14, 1995 [DE] Germany ............ 195 21 214

[51] Int. Cl.$^6$ .................................................. G21C 19/07
[52] U.S. Cl. ........................................................ 376/272
[58] Field of Search ................................. 376/272, 269; 250/506.1, 507.1

[56]            References Cited

U.S. PATENT DOCUMENTS

| | | | |
|---|---|---|---|
| 4,039,842 | 8/1977 | Mollon ................................ | 376/272 |
| 4,088,897 | 5/1978 | Soot .................................... | 376/272 |
| 4,319,960 | 3/1982 | Larson et al. ...................... | 376/272 |
| 4,630,738 | 12/1986 | Bosshard ............................. | 376/272 |
| 4,960,560 | 10/1990 | Machado et al. ................... | 376/272 |
| 5,365,556 | 11/1994 | Mallie ................................. | 376/272 |
| 5,473,645 | 12/1995 | Kowdley ............................. | 376/272 |

FOREIGN PATENT DOCUMENTS

| | | |
|---|---|---|
| 2259669 | 6/1974 | Germany . |
| 3519838A1 | 12/1986 | Germany . |
| 4134246A1 | 4/1993 | Germany . |
| 61/59292 | 3/1986 | Japan . |

OTHER PUBLICATIONS

Japanese Patent Abstract No. 87–138516, dated Apr. 8, 1987.
Japanese Patent Abstract No. 4–270994 (Tajiri), dated Sep. 28, 1992.

*Primary Examiner*—Daniel D. Wasil
*Attorney, Agent, or Firm*—Herbert L. Lerner; Laurence A. Greenberg

[57]            ABSTRACT

A storage basket, a storage rack and a method are provided for the compact storage of fuel elements and control rods of a nuclear power plant. The storage basket includes a plurality of inserts for receiving a fuel element. The inserts are disposed in such a way as to form a cruciform gap for receiving a control rod. Four fuel elements as well as one control rod of a boiling water nuclear power plant can be intermediately stored in a carrying well of a fuel element storage rack in a particularly compact and combined way by placing inserts in such a manner as to form a storage basket. A checkered configuration of the carrying wells of the fuel element storage rack permits intermediate positions between the carrying wells to also be supplied with one control rod and four fuel elements.

20 Claims, 4 Drawing Sheets

STORAGE BASKET AND METHOD FOR COMPACT STORAGE OF FUEL ELEMENTS AND CONTROL RODS

CROSS-REFERENCE TO RELATED APPLICATION

This application is a continuation of International Application Serial No. PCT/DE96/01017, filed Jun. 11, 1996.

BACKGROUND OF THE INVENTION

FIELD OF THE INVENTION

The invention relates to a storage basket having a plurality of inserts for receiving a fuel element of a nuclear power plant. The invention also relates to a fuel element storage rack for the compact storage of fuel elements, including a carrying structure for carrying the fuel elements and a storage basket having a plurality of inserts for receiving a fuel element. The invention furthermore relates to a method for the storage of fuel elements and control rods of a nuclear power plant.

In nuclear power plants for generating electrical energy from fissionable material, the fissionable material is inserted in so-called fuel elements. While the nuclear power plant is operating, the fissionable material in the fuel elements is split as a result of a nuclear chain reaction. After the fissionable material has been largely consumed, that is to say spent, the spent fuel elements are intermediately stored in so-called water-filled storage basins. Fuel element storage racks are provided for receiving the fuel elements in the storage basins.

German Published, Non-Prosecuted Patent Application DE 41 34 246 A1 describes a storage rack for fuel elements of a nuclear power plant, in which a plurality of wells having an essentially rectangular cross section are fastened on a base plate. The wells stand upright on the base plate and in each case are disposed diagonally opposite one another in a checkered manner. Some of the wells located diagonally opposite one another are connected to one another along mutually contiguous longitudinal edges through the use of at least two connecting elements. A first connecting element has high rigidity in a first direction which runs parallel to the base plate. A second connecting element likewise has high rigidity in a second direction which likewise runs parallel to the base plate. An angle between the first direction and the second direction is between 70° and 90°. The wells are connected to one another through the connecting elements in a mechanically stable manner, with high carrying capacity, in such a way as to form a unit. The walls of the wells serve as an absorption device for neutron radiation and are composed of an austenitic boron steel with a boron content of up to 2%. The fuel element storage rack described in German Published, Non-Prosecuted Patent Application DE 41 34 246 A1 allows a compact storage of fuel elements, wherein a fuel element is capable of being stored both in each well and in cavities formed between the wells. The fuel elements and the wells are extended along a main axis in each case, with the main axes running essentially parallel to one another. In that case, the main axes are essentially perpendicular on the base plate of the storage rack.

U.S. Pat. No. 4,960,560 describes a storage rack for fuel elements of a boiling water nuclear power plant. The storage rack has a rectangular base plate which rests on feet. A multiplicity of wells, each for receiving a fuel element, is disposed on the base plate. The wells are extended along a main axis which is perpendicular on the base plate. The wells are disposed on the base plate in a checkered manner, with the wells being welded to one another over their entire height along the outer edge of the base plate through the use of metal sheets, so that a continuous closed outer wall is formed. Circular orifices are present in the bottom of the base plate in each well. Moreover, some of the orifices have depressions differing from the circular shape, so that a lifting appliance which is introduced through them, after it has been rotated by a few degrees, can no longer be led through the orifice. As a result, an anchorage of the lifting appliance is provided, in a similar way to the lid of a teapot, and the possibility of lifting the base plate is thereby afforded.

Both German Published, Non-Prosecuted Patent Application DE 41 34 246 A1 and U.S. Pat. No. 4,960,560 relate merely to the compact storage of fuel elements. Neither of the two publications deals with the problem of storing other spent or irradiated core components, in particular control elements and control rods of a boiling water nuclear power plant.

SUMMARY OF THE INVENTION

It is accordingly an object of the invention to provide a storage basket and a storage rack for the compact storage of fuel elements and control rods and a method for the storage of fuel elements and control rods of a nuclear power plant, in particular a boiling water nuclear power plant, which overcome the hereinafore-mentioned disadvantages of the heretofore-known devices and methods of this general type.

With the foregoing and other objects in view there is provided, in accordance with the invention, a storage basket, comprising a plurality of inserts for receiving a fuel element of a nuclear power plant, the inserts defining a cruciform gap for receiving a control rod (control element).

By virtue of the formation of a cruciform gap between the inserts, the inserts can be slipped over a control rod which has a corresponding cruciform cross section. The control rod and the inserts are extended along a respective main axis. The main axes run essentially parallel to one another. The inserts are disposed appropriately according to the cross-sectional shape of the control rod. In this case, the control rod may have a cross section in the form of a simple cross, in each case with four wings of equal length which are perpendicular to one another. However, the wings may also be of different length and may not be orthogonal to one another. The number of wings may also be different from four. Both the control elements and the fuel elements can be stored intermediately in a space-saving manner through the use of this configuration of inserts for receiving a fuel element.

There is therefore no need for a separate storage rack or special suspension devices on the walls of the storage basin above the storage racks for fuel elements. The length of the inserts depends on the length of the fuel elements to be received. The region of the fuel elements which is exposed to radioactive radiation is enclosed by the respective insert for absorption purposes. The insert forms an absorber well having a wall made preferably of austenitic boron steel. The position of the insert relative to the control element depends, in particular, on the shape of the control element. In the case of a dish-shaped foot part of the control element the insert is disposed geodetically above the foot part. In the case of a cruciform foot part, the insert may also extend over this foot part. The insert and therefore the storage basket project with a lifting device beyond the control element. The storage basket may thereby be slipped over the control element and lifted off therefrom again in a simple way.

In accordance with another feature of the invention, the inserts have a rectangular, in particular quadratic, cross-sectional area and extend along a main axis in a direction perpendicular to the cross-sectional area.

As a result, particularly in the case of a cruciform control rod having wings that are orthogonal to one another, a particularly good utilization of space is achieved. A configuration composed of a control rod and a storage basket thus has an essentially rectangular, in particular quadratic cross-sectional area. The control rod and the storage basket can thereby be introduced into a carrying well of a storage rack in a particularly simple and space-saving way.

In accordance with a further feature of the invention, the plurality of inserts includes four inserts, which may be disposed in each quadrant of a simple cross. Each control rod may thus be surrounded directly by four fuel elements.

In accordance with an added feature of the invention, adjacent inserts are fixedly connected to form a unit, preferably through the use of at least one connecting element in each case. One or more connecting sheets are suitable as a connecting element.

The connecting element or connecting elements are welded to the outer wall of adjacent inserts. In this case, adjacent inserts may be connected over the entire height of the outer wall or else only in a punctiform manner, that is to say over particular outer wall regions. The inserts which are thus connected to one another form a storage basket as a unit, which is capable of being slipped as a whole over a control rod. The storage basket preferably performs a pure storage function, that is to say it is slipped, in the non-loaded state, over the control element and is only subsequently loaded with fuel elements. Before the storage basket is lifted off from the control element, all of the fuel elements are first extracted from the storage basket again. The storage basket may, if appropriate, also be constructed as a transport container, so that when loaded with fuel elements, it can be slipped over the control element and can be lifted off therefrom again. Fuel elements can thereby be transported in a fuel element storage basin without any transloading.

In accordance with an additional feature of the invention, the inserts are connected to a supporting element for enclosing a foot part of the control rod and for supporting them on a carrying structure of a fuel element storage rack. In this case, the supporting element may be constructed as a tube having a round or rectangular cross section, with the cross-sectional area of the supporting element covering the greatest cross-sectional area of the foot part.

In accordance with yet another feature of the invention, the supporting element has a device for fastening the inserts, so that, in particular, they are secured against rotation. The supporting tube ensures that the lower edges of the fuel elements are located above the foot piece of a respective associated control element. The supporting element is itself secured against rotation.

In accordance with yet a further feature of the invention, the inserts are fastened, in particular welded, to a base plate which likewise has a cruciform gap sufficiently large to slip the base plate over a corresponding control rod.

In order to make it easier for the base plate and the inserts to be slipped over the control rod, the cruciform gap tapers over the thickness of the base plate towards the inserts. As a result, the storage basket, when being slipped over the control element, is centered by the latter and, consequently, the lowering of the storage basket along the main axis of the control element is markedly simplified.

In accordance with yet an added feature of the invention, in order to secure the inserts against rotation, a cruciform reinforcing element adapted to the cruciform gap is disposed at the upper end of the inserts. The reinforcing element secures the inserts, which may be constructed as square tubes, and supports them.

In accordance with yet an additional feature of the invention, the reinforcing element may have a device for lifting and transporting the storage basket. It may have at least one hook or transport bracket or it may be constructed as such. A gripping appliance may engage on the device, so that the storage basket can be transported in a fuel element storage basin and, in particular, can be inserted into a storage rack and extracted again.

In accordance with again another feature of the invention, the storage basket has a releasable locking element for securing the inserts against being lifted unintentionally. The locking element may be a drop latch which is rotatable about a center of rotation and which swings down due to its own weight in the cruciform gap, so that after the storage basket has been slipped over the control rod, the drop latch comes to rest below a projection of a carrying well. If the storage basket is lifted unintentionally, for example when a fuel element is extracted from an insert, the drop latch is pressed against the projection (holding-down device) and a further upward movement of the storage basket is thereby prevented. The locking element can be released through the use of an appropriately shaped gripping appliance capable of being introduced into the cruciform gap. In particular, a drop latch can be swung upward and therefore the storage basket can be lifted from the control element and out of the carrying well.

With the objects of the invention in view there is also provided a fuel element storage rack for the compact storage of fuel elements and control rods of a nuclear power plant, in particular of a boiling water nuclear power plant, comprising a carrying structure for carrying fuel elements and control rods; and a storage basket having a plurality of inserts for receiving a fuel element, the inserts defining a cruciform gap for receiving a control rod.

In accordance with another feature of the invention, there are provided carrying wells on the carrying structure for receiving a control rod and a storage basket. The carrying wells may, in this case, be disposed in the same way as in German Published, Non-Prosecuted Patent Application DE 41 34 246 A1 and may be connected to one another through the connecting elements specified therein. The storage rack may therefore make use of the advantageous properties of the storage rack described in German Published, Non-Prosecuted Patent Application DE 41 34 246 A1. Above all, a mechanically extremely stable structure of the storage rack is achieved through the use of the connecting elements, without an additional composite carrying system being required at the geodetically upper end of the wells. In this case, the control element and the storage basket may both be inserted in each carrying well and in the intermediate positions between the carrying wells that are disposed in a checkered manner. The storage basket and the storage rack are preferably suitable for the compact intermediate storage of fuel elements and control elements of a boiling water nuclear power plant.

With the objects of the invention in view there is additionally provided a method for the storage of fuel elements and control rods of a nuclear power plant, which comprises placing carrying wells on a carrying structure in a fuel element storage rack; and introducing both a control rod and at least one fuel element, preferably four fuel elements, in a respective one of the carrying wells.

In accordance with a concomitant mode of the invention, there is provided a checkered configuration of the carrying wells that forms interspaces, in which both a control rod and a fuel element are likewise disposed in each case. A particularly compact storage of control rods and fuel elements is achieved thereby, with the result that the number of storable fuel elements can be markedly increased in comparison with a separate storage of control rods.

Other features which are considered as characteristic for the invention are set forth in the appended claims.

Although the invention is illustrated and described herein as embodied in a storage basket and a storage rack for the compact storage of fuel elements and control rods and a method for the storage of fuel elements and control rods of a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
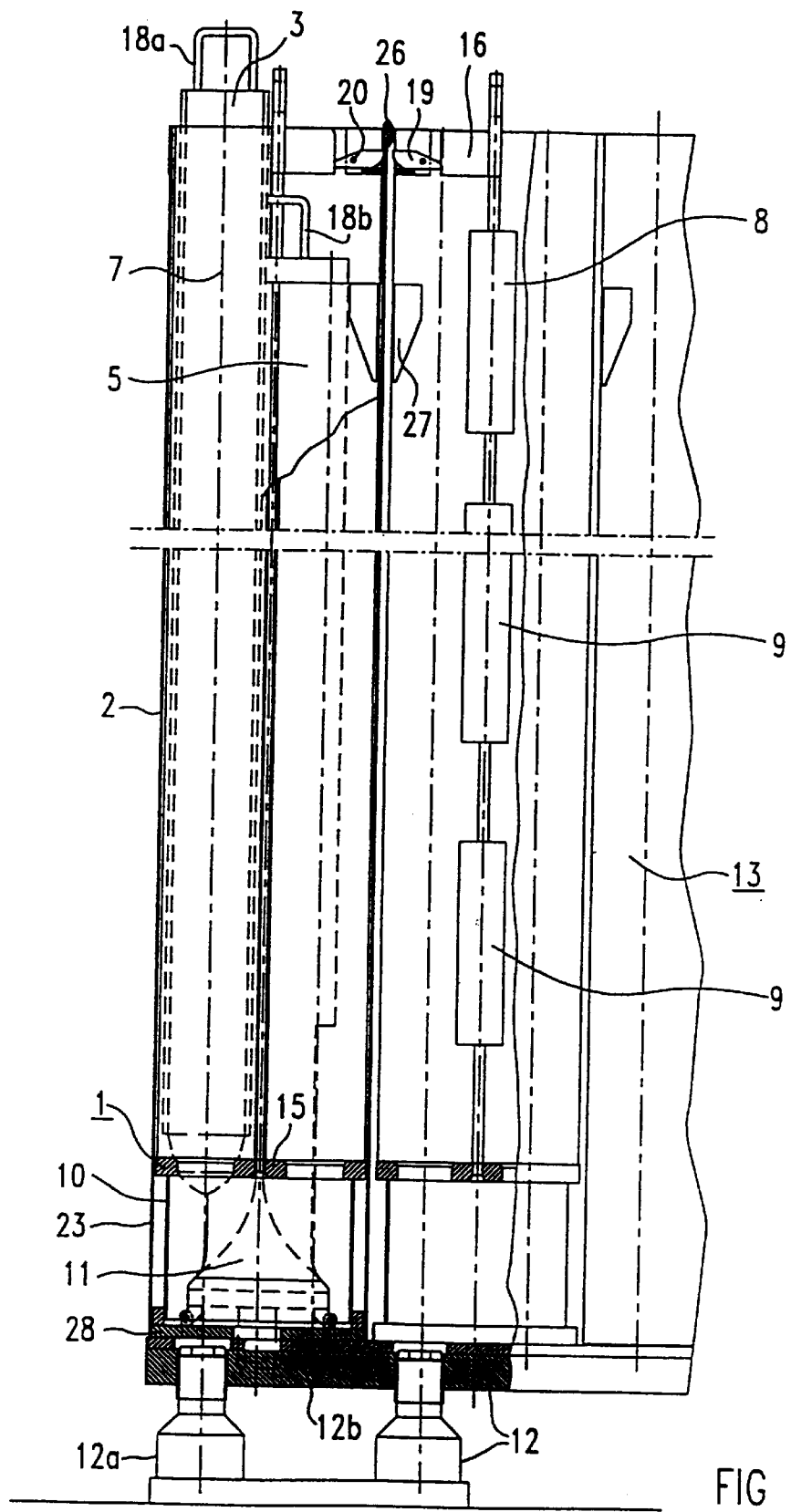
FIG. 1 is a fragmentary, diagrammatic, longitudinal-sectional view of a fuel element storage rack together with a storage basket.

Referring now to the figures of the drawings in detail and first, particularly, to FIG. 1 thereof, there is seen a fragmentary, longitudinal-sectional view of a fuel element storage rack 13 which has a carrying structure 12 with a plate 12b supported on feet 12a. A multiplicity of elongate carrying wells 23 having a square cross-sectional area are set up on the plate 12b. The carrying wells 23 extend along a main axis 7 which is perpendicular to the plane of the plate 12b. Only one carrying well 23 is illustrated for the sake of clarity. A control rod 5 of a boiling water reactor is introduced into the carrying well 23. The control rod 5 has a foot part 11 with which it sits on a bottom plate 28 of the carrying well 23. The control rod 5, which has a cruciform cross section (seen in FIG. 5) and the dish-shaped foot part 11, has a storage basket 1 slipped over it. The storage basket 1 has four inserts 2 which extend along the main axis 7 and rest on a base plate 15 that comes to rest above the foot part 11 of the control rod 5. The base plate 15 of the inserts 2 is connected to a tubular supporting element 10. The supporting element 10 surrounds the foot part 11 of the control rod 5 and is releasable fixed to the bottom plate 28 of the carrying well 23, in particular through the use of four pins. A fuel element 3 is disposed in each insert 2, although again only one of these fuel elements is illustrated for the sake of clarity.

Adjacent inserts 2 are fixedly welded to one another through a plurality of connecting elements 8 which are constructed as connecting sheets 9. A geodetically upper region of each insert 2 has a locking element constructed as a drop latch 19. The drop latch 19 is rotatable about a center of rotation 20 and rests largely against the carrying well 23, in a position assumed as a result of its own weight. The carrying well 23 has a holding-down device 26 (seen in FIG. 2) geodetically above the drop latch 19. When the storage basket 1 is being lifted, it is prevented from executing an unintended upward movement due to the fact that the drop latch 19 rests against the holding-down device 26. A centering device 27 which is provided geodetically below the drop latch 19 ensures that the storage basket 1 and the control rod 5 are centered in the carrying well 23. The placement of the inserts 2, each of which receives a fuel element 3, around the cruciform control rod 5, achieves a combined and compressed intermediate storage of fuel elements 3 and control rods 5 in the fuel element storage rack 13 in a fuel element storage basin. This configuration can be obtained for any desired control rod having a cruciform cross section. The actual structure of the foot part 11 of the control rod 5 is also not important for achieving a compressed intermediate storage of fuel elements 3 and control rods 5. A compact storage of control rods 5 of the common structure is thus possible.

Figure 2:
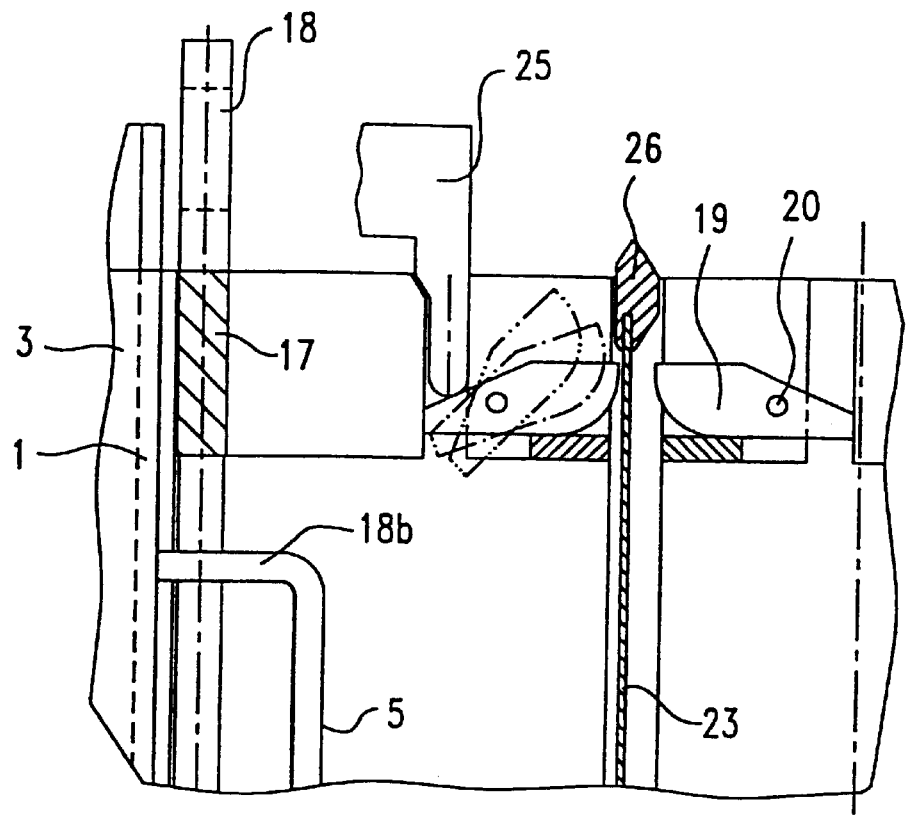
FIG. 2 is an enlarged, fragmentary, longitudinal-sectional view of an upper region of the fuel element storage rack according to FIG. 1.

FIG. 2 shows an upper region of FIG. 1 on an enlarged scale, in which the rotatability of the drop latch 19 about the center of rotation 20 is clearly visible. This drop latch 19 can be rotated out of a locked position by an illustrated gripping appliance 25 which is led into the insert 2 from above. The insert 2 can thereby be lifted out of the carrying well 23 past the holding-down device 26 of the carrying well 23. The insert 2 is lifted with a cruciform reinforcing element 17 in the geodetically upper region or end 16 of the insert 2 for securing the insert 2 against rotation. This reinforcing element 17 is provided with a carrying bracket 18, on which a non-illustrated lifting appliance can engage. This ensures that the carrying well 23 can be loaded with a control rod 5 and the storage basket 1 as well as the fuel elements 3 and that it can be correspondingly unloaded in a simple way. For this purpose, the fuel elements 3 and the control rod 5 likewise have corresponding carrying brackets 18a, 18b (seen in FIG. 1). The carrying bracket 18a of the fuel element 3 projects out of the carrying well 23 further than the carrying bracket 18b of the control element 5. The carrying well 23 is loaded by first inserting the control element 5, then the storage basket 1 and finally the fuel elements 3. Unloading takes place in reverse order. The storage basket 1 may also be constructed as a transport container, so that a storage basket 1 that is already loaded with fuel elements 3 can be introduced into and taken out of the carrying well 23.

Figure 3:
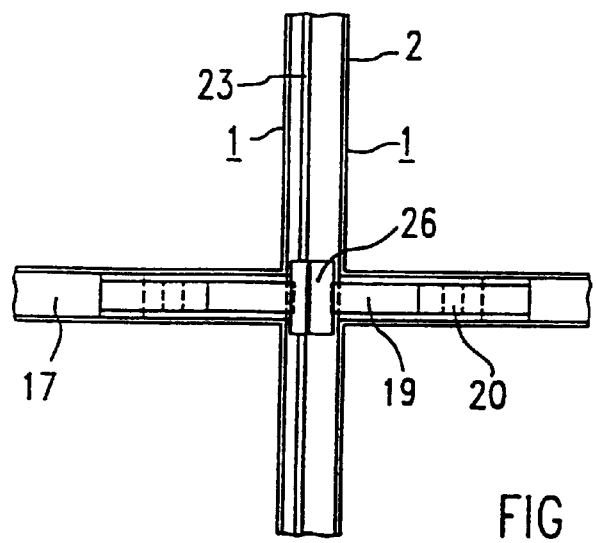
FIG. 3 is a fragmentary, cross-sectional view of the fuel element storage basin according to FIG. 2.

FIG. 3 is a cross-sectional view of a region around a holding-down device 26. The holding-down device 26 is fastened to the carrying well 23, so that locking elements 19 of two adjacent storage baskets 1 are blocked against upward movement by the holding-down device 26.

Figure 4:
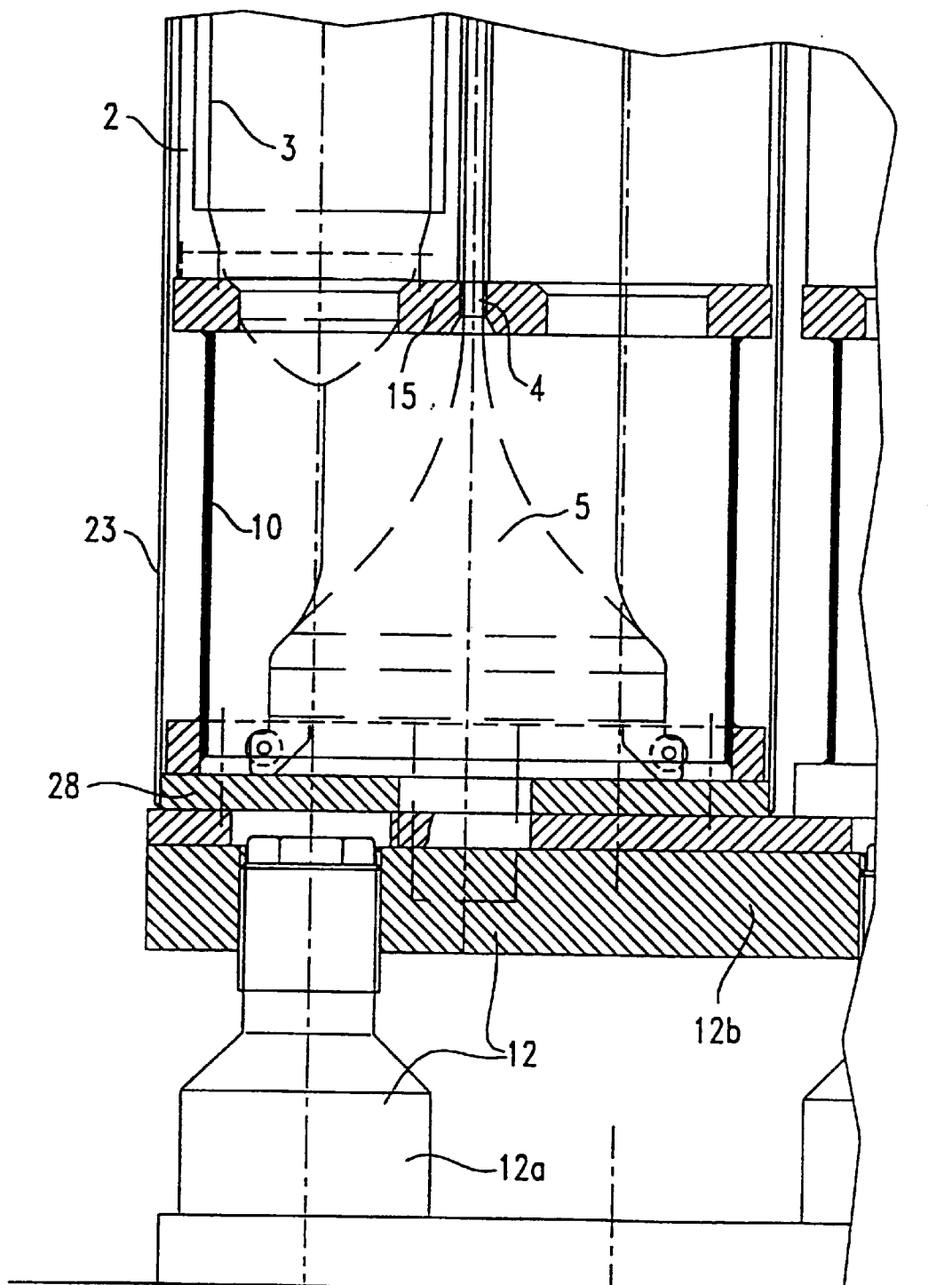
FIG. 4 is an enlarged, fragmentary, longitudinal-sectional view of a lower region of the fuel element storage rack according to FIG. 1.

FIG. 4 shows a portion of the storage rack 13 according to FIG. 1 on an enlarged scale in a region between the carrying structure 12 and the base plate 15 of the inserts 2. The meaning of the reference symbols is the same as that in FIG. 1.

Figure 5:
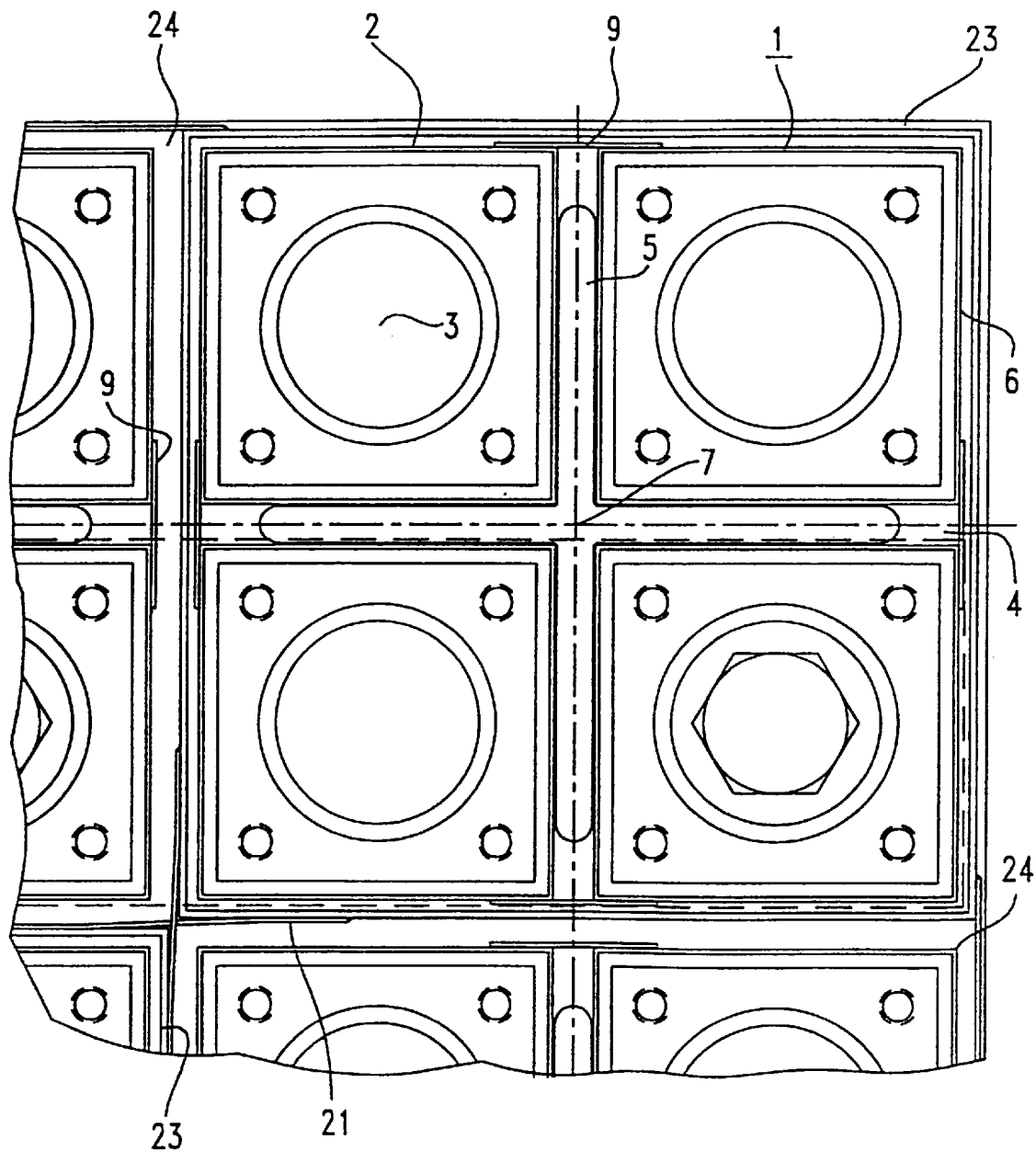
FIG. 5 is a cross-sectional view of a lower region of a fuel element storage rack.

FIG. 5 illustrates a cross section through the storage rack 13. For the sake of clarity, only one storage basket 1, which is introduced in a corresponding carrying well 23, is shown completely. Adjacent carrying wells 23 are fixedly connected to one another through cruciform spacer elements 21. The spacer elements 21 have wings which are not orthogonal to one another. The storage basket 1 has a quadratic cross-sectional area 6. A cruciform gap 4 is formed by four inserts 2 which are disposed within a square, are symmetrical to the main axis 7 and likewise have a quadratic cross-sectional area. A cruciform control rod 5 is introduced in the gap 4, likewise symmetrically to the main axis 7. Adjacent inserts 2 are connected to one another through respective connecting sheets 9 in such a manner as to close off the cruciform gap 4, so that the inserts form a unit. A fuel element 3 is disposed within each insert. In this case, the inserts 2 surround the control rod 5. Four fuel elements 3 and one control rod 5 can be introduced in each carrying well 23 by placing the inserts 2 in such a way as to surround the control rod 5. This makes it possible to achieve a particularly compact intermediate storage of fuel elements 3 and control rods 5 of a boiling water reactor. The quadratic carrying wells 23 are disposed in the manner of a checkered pattern, with intermediate positions 24 which are formed between the carrying wells 23 and can likewise be supplied with a storage basket 1 and a control rod 5.

The invention is distinguished by a storage basket which can be slipped over a cruciform control rod of a boiling water reactor. For this purpose, the storage basket preferably has four inserts which are spaced from one another and are fixedly connected to one another in such a way as to form a cruciform gap between them in which the control rod can be positioned. One control rod and four fuel elements can be accommodated in a single carrying well of a fuel element storage rack by virtue of this configuration. This achieves a particularly compact and combined intermediate storage of fuel elements and control rods of a boiling water reactor in a fuel element storage basin.

We claim:

1. A storage basket, comprising:
a plurality of inserts for receiving a fuel element of a nuclear power plant, said inserts defining a cruciform gap for receiving a control rod.

2. The storage basket according to claim 1, wherein said inserts have a rectangular cross-sectional area and extend along a main axis in a direction perpendicular to the cross-sectional area.

3. The storage basket according to claim 1, wherein said inserts have a quadratic cross-sectional area and extend along a main axis in a direction perpendicular to the cross-sectional area.

4. The storage basket according to claim 1, wherein said plurality of inserts includes four inserts.

5. The storage basket according to claim 1, including at least one connecting element fixedly connecting said adjacent inserts to form a unit.

6. The storage basket according to claim 1, including a connecting sheet fixedly connecting said adjacent inserts to form a unit.

7. The storage basket according to claim 1, including a supporting element for enclosing a foot part of the control rod and for supporting said inserts on a carrying structure of a fuel element storage rack.

8. The storage basket according to claim 1, including a base plate having a given thickness, said inserts placed on and fastened to said base plate, and said base plate having a cruciform gap tapering over the given thickness of said base plate toward said inserts.

9. The storage basket according to claim 1, including at least one releasable locking element for securing said inserts against unintentional lifting.

10. A fuel element storage rack for the compact storage of fuel elements and control rods of a nuclear power plant, comprising:
a carrying structure for carrying fuel elements and control rods; and
a storage basket having a plurality of inserts for receiving a fuel element, said inserts defining a cruciform gap for receiving a control rod.

11. The storage rack according to claim 10, including carrying wells each receiving a control rod and a storage basket, said carrying wells disposed on said carrying structure.

12. A method for the storage of fuel elements and control rods of a nuclear power plant, which comprises:
placing carrying wells on a carrying structure in a fuel element storage rack; and
introducing, in a respective one of the carrying wells, both a control rod and a storage basket having a plurality of inserts, the inserts defining a cruciform gap for receiving the control rod; and
introducing at least one fuel element in the storage basket.

13. The method according to claim 12, which comprises introducing four fuel elements in the storage basket.

14. The method according to claim 13, which comprises placing the carrying wells in a checkered pattern defining interspaces therebetween, and placing both the control rod and the fuel elements in a respective one of the interspaces.

15. A storage basket, comprising:
a plurality of inserts for receiving a fuel element of a nuclear power plant, said inserts defining a cruciform gap for receiving a control rod; and
a supporting element for enclosing a foot part of the control rod and for supporting said inserts on a carrying structure of a fuel element storage rack, said supporting element having a device for fastening said inserts.

16. A storage basket, comprising:
a plurality of inserts for receiving a fuel element of a nuclear power plant, said inserts defining a cruciform gap for receiving a control rod; and
a supporting element for enclosing a foot part of the control rod and for supporting said inserts on a carrying structure of a fuel element storage rack, said supporting element having a device for securing said inserts against rotation.

17. A storage basket, comprising:
a plurality of inserts for receiving a fuel element of a nuclear power plant, said inserts defining a cruciform gap for receiving a control rod and having an upper end with a cruciform reinforcing element for securing said inserts against rotation.

18. The storage basket according to claim 17, wherein said reinforcing element has a device for lifting and transporting.

19. The storage basket according to claim 18, wherein said device is at least one hook.

20. A storage basket, comprising:
a plurality of inserts for receiving a fuel element of a nuclear power plant, said inserts defining a cruciform gap for receiving a control rod; and
a drop latch rotatable about a center of rotation for securing said inserts against unintentional lifting.

* * * * *